July 31, 1928.
C. SCHULTZ
WINDSHIELD WIPER
Filed July 14, 1927
1,679,097
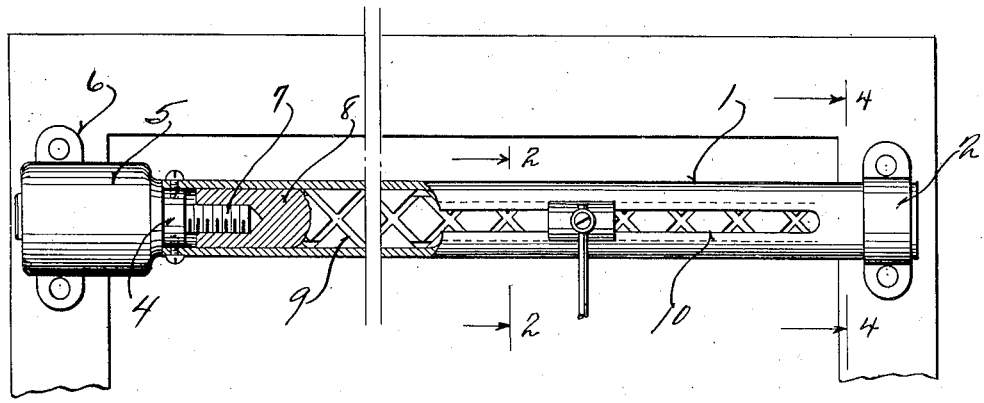
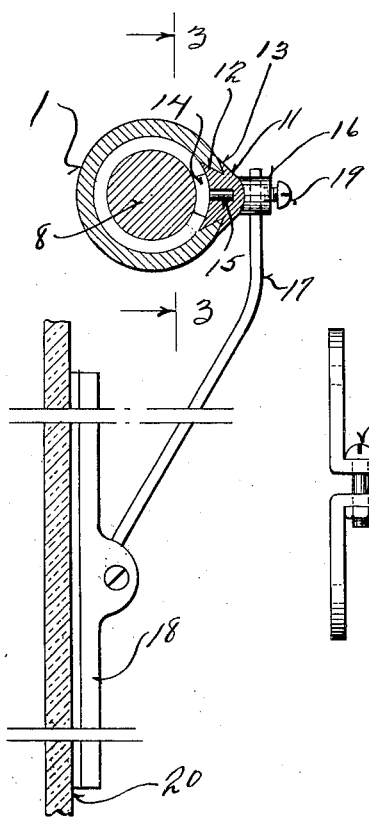
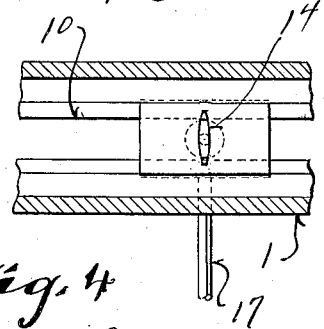
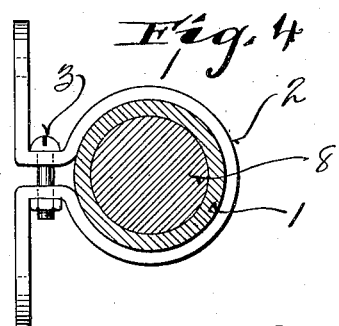
Inventor
Charles Schultz Patented July 31, 1928.

1,679,097

UNITED STATES PATENT OFFICE.

CHARLES SCHULTZ, OF NORTH MILWAUKEE, WISCONSIN.

WINDSHIELD WIPER

Application filed July 14, 1927. Serial No. 205,623.

This invention relates to windshield wipers.

Windshield wipers having an electric motor and an endless screw have heretofore been constructed, but these devices have not proven wholly satisfactory due to the inability to prevent vibration of the screw as it is rapidly rotated by the motor and also due to the complicated and relatively clumsy and objectionable appearance of the device.

This invention is designed to overcome the defects noted above and objects of this invention are to provide a novel form of windshield wiper in which an endless screw is employed and is held against vibration throughout its entire length so that it runs quietly at all times without any possibility of rattling, and to provide means for guiding the cross head in a secure manner without having any projecting guiding rods or other unsightly members.

In general, this invention is designed to provide an endless screw windshield wiper which may be readily attached to the upper portion of a windshield or the front of a car and which is very compact and of neat appearance.

An embodiment of the invention is shown in the accompanying drawings in which:

Figure 1 is a view from the inner side of an automobile showing the device in place with parts broken away and in section;

Figure 2 is a sectional view on the line 2—2 of Figure 1;

Figure 3 is a fragmentary sectional view on the line 3—3 of Figure 2 with the screw omitted;

Figure 4 is a sectional view on the line 4—4 of Figure 1.

Referring to the drawings, it will be seen that an elongated cylindrical tube or casing 1 is provided and is carried rigidly at one end by means of a clip 2 clamped by the bottom 3 and secured to the marginal portion of the windshield or any suitable part at the front of the automobile. The other end of the casing 1 is securely fitted upon the projecting bearing 4 of a small electric motor 5. This electric motor is provided with feet 6 by means of which it is readily attached, as shown in Figure 1. The motor shaft projects outwardly and is provided with a threaded portion 7 which is directly and rigidly screwed into a correspondingly threaded aperture in the end of the screw or shaft 8. This shaft is provided with screw threads or grooves arranged in a crossing manner in the usual way and indicated by the reference character 9. It has a bearing fit within the casing 1 and is thus supported throughout its length by means of the tubular casing so that although the screw may be run at a high rate of speed, rattling or vibration cannot result at any portion of its length.

The casing 1 is provided with an elongated slot 10 (see Figures 1 and 3) and it is to be noted that the edges of the slot are bevelled, as shown most clearly in Figure 2. A cross head 11 is arranged to travel within this slot and is provided with a dovetailed inner portion 12 and a pair of lips 13. The dovetailed portion fits the bevelled edges of the groove or slot, as shown in Figure 2, and the lips 13 ride upon the outer face of the tubular casing 1. Thus, a very secure and adequate sliding support is furnished the cross head without the necessity of any external guiding rods or other members. In fact, from Figure 2, it is apparent that the cross head may have its outer face rounded and generally merging into the contour of the casing 1. This cross head is provided with a rocking shoe 14. For example, the shoe 14 may be integral or rigid with a pin 15 pivotally mounted within the cross head, as shown in Figure 2. The shoe is provided with tapered ends, as may be seen from Figure 4, and readily follows the threads or grooves 9 in the screw reversing at the ends, as these screw threads are formed continuously and turn backwardly upon themselves at the ends of the screw in the usual manner.

The cross head 11 is provided with an integral projecting boss 16 which is apertured for the reception of the rod 17 of the wiper 18. This rod is locked in any adjusted position by means of the set screw 19. The wiper and rod are so formed that the wiper bears with the exact desired pressure against the windshield 20 (see Figure 2).

In operation, the motor runs continuously, and rapidly rotates the elongated screw. This causes the cross head to reciprocate back and forth along the casing and consequently carries the wiper back and forth in a regular and even manner.

From actual tests conducted with this apparatus it has been found that the device is remarkably quiet and free from vibration and is highly effective in operation.

It is to be noted also that it is of extremely simple construction and has no objectionable projecting parts.

Although the invention has been described in considerable detail, such description is intended as illustrative rather than limiting as the invention may be variously embodied and as the scope of such invention is to be determined as claimed.

I claim:

In a windshield wiper, the combination of a tubular casing having an elongated slot provided with bevelled edges, an endless screw fitting within and supported throughout its length by said casing, a cross head having portions interlocking with the bevelled edges of the casing at said slot and projecting through such slot, said cross head cooperating with said screw, whereby reciprocatory motion is imparted to said cross head upon rotation of said screw, said cross head being adapted to carry a cleaning element, an electric motor having a casing fitting within and secured to one end of said first mentioned casing, said electric motor having a driving shaft directly operatively coupled to said screw, and a support for the other end of said first mentioned casing.

In testimony that I claim the foregoing I have hereunto set my hand at Milwaukee, in the county of Milwaukee and State of Wisconsin.

CHARLES SCHULTZ.